(12) United States Patent
Ueda et al.

(10) Patent No.: US 6,605,371 B1
(45) Date of Patent: Aug. 12, 2003

(54) BRAZING ALLOY FOR STAINLESS STEEL, STRUCTURE BRAZE-ASSEMBLED WITH THE BRAZING ALLOY, AND BRAZING MATERIAL FOR STAINLESS STEEL

(75) Inventors: Masami Ueda, Higashi-Osaka; Masaaki Ishio, Osaka; Hidetoshi Noda, Toyonaka; Tsuyoshi Hasegawa, Ibaraki, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/554,947

(22) PCT Filed: Sep. 20, 1999

(86) PCT No.: PCT/JP99/05155

§ 371 (c)(1),
(2), (4) Date: May 22, 2000

(87) PCT Pub. No.: WO00/18537

PCT Pub. Date: Apr. 6, 2000

(30) Foreign Application Priority Data

Sep. 28, 1998 (JP) .......................... 10-272406

(51) Int. Cl.$^7$ .................. B32B 15/18; C22C 19/03
(52) U.S. Cl. .............. 428/679; 148/426; 148/435; 148/442; 420/457; 420/459; 420/485; 420/487; 420/493; 420/587; 428/656; 428/671; 428/676; 428/677; 428/680; 428/940
(58) Field of Search ................ 428/679, 680, 428/671, 656, 676, 677, 940; 420/457, 459, 485, 487, 493, 587; 148/442, 426, 435

(56) References Cited

U.S. PATENT DOCUMENTS

| | | | | |
|---|---|---|---|---|
| 3,152,871 A | * | 10/1964 | Matchen | 428/679 |
| 3,359,084 A | * | 12/1967 | Cape | 428/656 |
| 4,704,338 A | | 11/1987 | Landingham et al. | 428/679 |
| 5,725,682 A | * | 3/1998 | Hashimoto | 148/220 |

FOREIGN PATENT DOCUMENTS

| | | | |
|---|---|---|---|
| DE | 235154 | * | 4/1986 |
| EP | 0309786 A1 | * | 4/1989 |
| EP | 0595254 A1 | * | 5/1994 |
| EP | 0595254 A1 | * | 5/1994 |
| JP | 42-22872 | * | 11/1967 |
| JP | 60-72695 | * | 4/1985 |
| JP | S61-209966 | | 9/1986 |
| JP | H6-21088 | | 8/1994 |
| JP | 7-25676 | | 1/1995 |
| JP | 7-025676 A | * | 1/1995 |
| JP | 8-206876 | | 8/1996 |
| JP | 9-285888 | * | 11/1997 |
| JP | 10-29075 | | 2/1998 |
| JP | 11-179588 | | 7/1999 |
| JP | 11-254180 | | 9/1999 |
| SU | 659326 | * | 4/1979 |

* cited by examiner

Primary Examiner—Robert R. Koehler
(74) Attorney, Agent, or Firm—Jordan and Hamburg LLP (57) ABSTRACT

A brazing alloy according to the present invention has a melting point equivalent to that of a copper brazing filler and is excellent in corrosion- and oxidation-resistance. The brazing alloy consists essentially of Mn, Ni and Cu, and has a composition in terms of weight percentage which, when plotted on a diagram as shown in FIG. 1, falls within a range defined by: the point A (37% Mn, 63% Ni, 0% Cu), the point B (18% Mn, 27% Ni, 55% Cu); the point C (42% Mn, 3% Ni, 55% Cu); the point D (50% Mn, 3% Ni, 47% Cu); and the point E (50% Mn, 50% Ni, 0% Cu), wherein Mn=50% is exclusive. A brazing material according to the present invention comprises: a Mn-based metal layer which is composed of a Mn—Ni alloy or a Mn—Ni—Cu alloy; and a Ni—based metal layer which is composed of Ni, a Ni alloy, or a Ni—Cu alloy, wherein the Mn-based metal layer and the Ni-based metal layer are bonded to each other in a stacked relation, and an average content of each of the essential elements in any cross section perpendicular to the length of the brazing material falls within the composition range of the aforesaid brazing alloy.

16 Claims, 3 Drawing Sheets

BRAZING ALLOY FOR STAINLESS STEEL, STRUCTURE BRAZE-ASSEMBLED WITH THE BRAZING ALLOY, AND BRAZING MATERIAL FOR STAINLESS STEEL

TECHNICAL FIELD

The present invention relates to a brazing alloy and a brazing material for stainless steel, which are to be used for braze-joining stainless steel components to each other or for braze-joining a stainless steel component to an iron or a steel component. The invention further relates to a structure braze-assembled with the use of such a brazing alloy. Examples of the braze-assembled structure include heat exchangers such as radiators and gas coolers, chemical apparatuses, and composite pipes having a stainless steel sleeve.

BACKGROUND ART

With an internationally growing interest in environmental issues, there has recently been an increasing demand for reduction in automobile emission, which is typified by mandatory introduction of zero emission vehicles (ZEVs) which is to come into effect in the State of California, the United States. As part of measures for automobile emission cleaning, a variety of cleaning apparatuses such as catalytic converters and thermal reactors for converting CO and HC into $CO_2$ and $H_2O$ by re-combustion of emission gas have already been put into practical applications.

A conventional heat exchanger for use in such an emission gas cleaning apparatus is generally composed of a stainless steel, such as SUS304 or SUS430 specified by JIS (Japanese Industrial Standard), which is highly corrosion-resistant. Components of the heat exchanger are braze-joined to each other with a copper brazing filler or a copper-based brazing alloy which consists of 5 to 20% of Mn, optional 1 to 5% of Ni, and the balance of Cu, as disclosed in Japanese Unexamined Patent Publication No. 60-72695 (1985).

With recent improvement and development of thermal reactor systems, however, heat exchangers thereof are subjected to a severer corrosive environment due to changes in the composition of the emission gas and the like. This results in such problems as exfoliation of an oxide scale due to repeated heat cycles during use and corrosion by emission gas condensate.

Therefore, a brazing alloy for use in assembling of such a heat exchanger is required to be more resistant to corrosion and oxidation.

The corrosion- and oxidation-resistant requirements are not directed only to the automobile emission gas cleaning systems. The resistance to corrosion and oxidation is required not only for various emission gas heat exchangers for gas turbine engines and the like, but also for chemical apparatuses for use in corrosive and oxidative environments and for iron or steel structures comprising stainless steel components braze-joined to a desired portion thereof to be exposed to such environments.

It is therefore an object of the present invention to provide a brazing alloy for stainless steel which provides a braze-joint having excellent corrosion- and oxidation-resistance, to provide a structure braze-assembled with the use of such a brazing alloy, and to provide a brazing material for stainless steel which ensures higher productivity.

DISCLOSURE OF THE INVENTION

Figure 1:
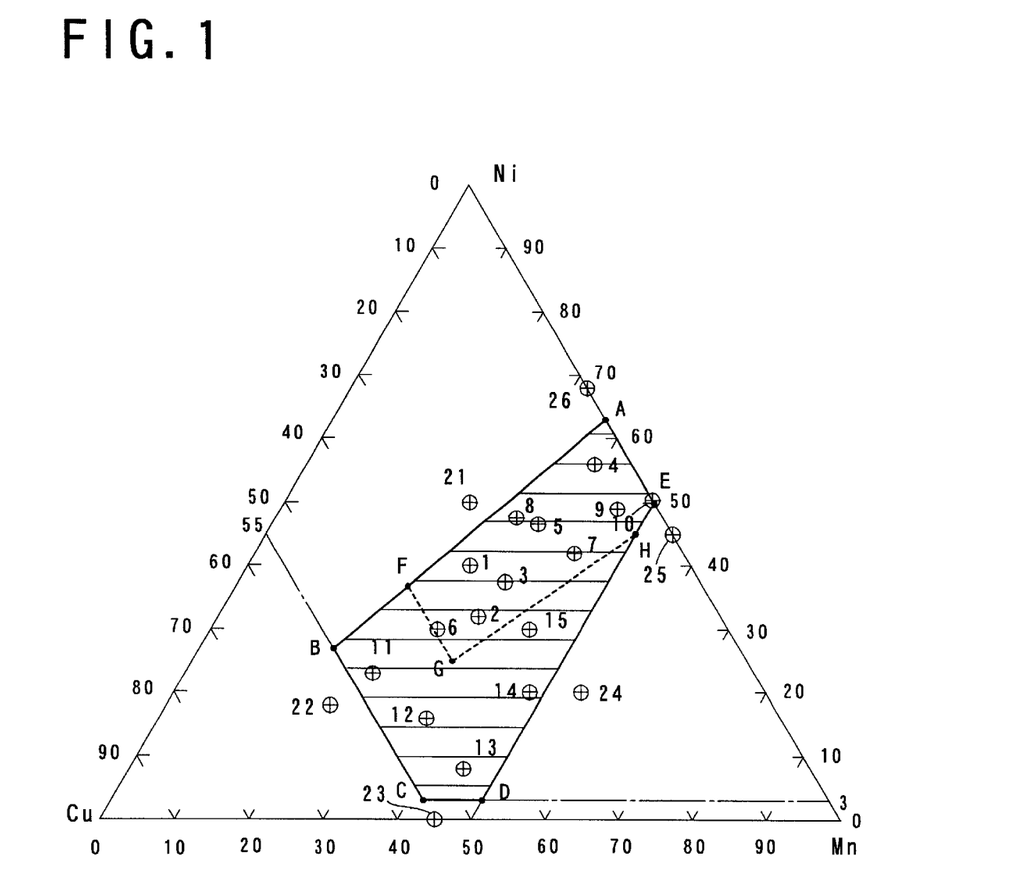
FIG. 1 is a composition diagram illustrating the range of the composition of a brazing alloy consisting essentially of Mn, Ni and Cu according to the present invention.

A brazing alloy for stainless steel according to the present invention is a brazing alloy which is to be used for braze-joining a stainless steel component to a component composed of iron or steel including stainless steel. The brazing alloy consists essentially of Mn, Ni and Cu, and has a composition in terms of weight percentage which, when plotted on a diagram as shown in FIG. 1, falls within a range defined by:

the point A (37% Mn, 63% Ni, 0% Cu);

the point B (18% Mn, 27% Ni, 55% Cu);

the point C (42% Mn, 3% Ni, 55% Cu);

the point D (50% Mn, 3% Ni, 47% Cu); and the point E (50% Mn, 50% Ni, 0% Cu), wherein Mn=50% is exclusive. For convenience, weight percentages will often be represented simply by "%".

Various studies have been made on the composition of an alloy comprising Cu, Ni and Mn as essential elements to impart the alloy with excellent corrosion- and oxidation-resistance and a melting point equivalent to that of a copper brazing filler and, as a result, it has been found that the alloy having the composition which falls within the range defined by the points A, B, C, D and E in FIG. 1 (wherein Mn=50 wt % is exclusive) has the aforesaid properties. More specifically, the Cu and Ni contents should be Cu≦55% (preferably, Cu<50%) and Ni≧3.0%, respectively, for excellent corrosion-resistance. If the Mn content is too high, the oxidation-resistance is deteriorated. Therefore, the Mn content should be Mn<50% for excellent oxidation resistance. In order to impart the brazing alloy with a melting point of 1100 to 900° C. so that diffusion of Fe from the stainless steel into the brazing alloy can be suppressed at brazing and so that a structure having a stainless steel component and an iron or a steel component can be braze-assembled simultaneously with annealing of these components, the Ni content should be lower than a line A-B in FIG. 1, because an alloy having a Ni content higher than the line A–B has a melting point of higher than 1100° C. A line A–E in FIG. 1 represents a composition range where the Cu content is Cu=0%. The inventors have found that this range is inclusive in the composition range of the brazing alloy for stainless steel.

In accordance with the invention, an element other than the essential elements Cu, Ni and Mn which does not deteriorate the corrosion- and oxidation-resistance and the low melting point property of the brazing alloy in the aforesaid composition range but even improves these properties can be added to the brazing alloy. For example, one or more elements selected from the group consisting of not greater than 5.0% of Cr, not greater than 5.0% of Co, not greater than 5.0% of Mo, not greater than 5.0% of Al and not greater than 3.0% of Ti may be present in a total amount of not greater than 5.0% in the brazing alloy. Further, not greater than 2.0% of Si may be present in the brazing alloy either alone or along with the aforesaid element such as Cr.

A braze-assembled structure according to the present invention comprises a stainless steel component and a component composed of iron or steel including stainless steel, wherein the stainless steel component and the component are braze-joined to each other with the aforesaid brazing alloy for stainless steel. The braze-assembled structure is highly corrosion- and oxidation-resistant as a whole, because its braze-joint is composed of the aforesaid brazing alloy thereby to have excellent corrosion- and oxidation-resistance.

A brazing material for stainless steel according to the present invention is a brazing material which is to be used for braze-joining a stainless steel component to a component composed of iron or steel including stainless steel. The brazing material comprises: at least one Mn-based metal layer which is composed of a Mn—Ni alloy consisting essentially of Mn and Ni or a Mn—Ni—Cu alloy consisting essentially of Mn, Ni and Cu; and at least one Ni-based metal layer which is composed of Ni, a Ni alloy consisting essentially of Ni, or a Ni—Cu alloy consisting essentially of Ni and Cu. The Mn-based metal layer and the Ni-based metal layer are bonded to each other in a stacked relation, and an average content of each of the elements in any cross section perpendicular to the length of the brazing material falls within the composition range of the brazing alloy.

The brazing alloy of the present invention generally has a bad workability. Particularly, the brazing alloy, if having a composition which falls within a range defined by the point A, the point F (23% Mn, 37% Ni, 40% Cu), the point G (35% Mn, 25% Ni, 40% Cu), the point H (50% Mn, 45% Ni, 5% Cu) and the point E in the aforesaid composition range in FIG. 1, is difficult to work. In accordance with the invention, the Mn-based metal layer and the Ni-based metal layer of the brazing material can be composed of a Mn—Ni or Mn—Ni—Cu alloy, and Ni or a Ni or Ni—Cu alloy, respectively, which are commercially available as general purpose metal materials and generally have a good workability. Since the average content of each of the elements in any cross section perpendicular to the length of the brazing material falls within the composition range of the brazing alloy, the Mn-based metal layer and the Ni-based metal layer are melted together to provide the aforesaid brazing alloy composition when the brazing material fuses at brazing. This brazing material is neither in a powdery form nor in a scale form but has a definite shape, thereby ensuring a satisfactory brazing operability. The brazing material ensures a high productivity unlike the brazing alloy of the present invention having a bad workability, because there is no need to cast the brazing alloy and shape a piece of the cast alloy into a proper form such as a linear form.

Another brazing material according to the present invention is a brazing material for stainless steel which is to be used for braze-joining a stainless steel component and a component composed of iron or steel including stainless steel. The brazing material comprises a Mn-based metal layer which is composed of a Mn—Ni alloy consisting essentially of Mn and Ni or a Mn—Ni—Cu alloy consisting essentially of Mn, Ni and Cu, and two Ni-based metal layers which are each composed of Ni, a Ni alloy consisting essentially of Ni, or a Ni—Cu alloy consisting essentially of Ni and Cu. The Ni-based metal layers are stacked on opposite sides of the Mn-based metal layer and press-bonded thereto, and an average content of each of the elements in any cross section perpendicular to the length of the brazing material falls within the composition range of the brazing alloy.

Since the Ni-based metal layers are more corrosion-resistant than the Mn-based metal layer, the brazing material of the invention has outer surfaces less susceptible to corrosion with the least number of layers including the Mn-based metal layer and the Ni-based metal layers. This prevents deterioration in the quality of the brazing material and ensures easy handling. Since the Ni-based metal layers are press-bonded to the Mn-based metal layer, the brazing material of laminate structure can easily be produced. This ensures a higher industrial productivity, and reduces production costs. The press-bonding can easily be achieved by stacking the Ni-based metal layers on the Mn-based metal layer and passing the resulting stack between a pair of press rolls.

BEST MODE FOR CARRYING OUT THE INVENTION

For improvement of the corrosion- and oxidation-resistance of a copper brazing filler, addition of a great amount of Ni is effective as known for cupro-nickel or Monel metal. However, the melting point of the brazing filler is raised with an increase in the Ni content. If stainless steel is brazed with the use of such a high melting point brazing material, Fe in the stainless steel diffuses into the brazing material, thereby deteriorating the corrosion-resistance. Intensive studies have been made on improvement in the corrosion- and oxidation-resistance of a brazing alloy by addition of Ni and suppression of increase in the melting point of the brazing alloy and, as a result, the inventors have attained the present invention.

First, an explanation will be given to a brazing alloy for stainless steel according to the present invention. The brazing alloy consists essentially of Mn, Ni and Cu, and has a composition in terms of weight percentage which, when plotted on a diagram as shown in FIG. 1, falls within a range defined by:

the point A (37% Mn, 63% Ni, 0% Cu);
the point B (18% Mn, 27% Ni, 55% Cu);
the point C (42% Mn, 3% Ni, 55% Cu);
the point D (50% Mn, 3% Ni, 47% Cu); and
the point E (50% Mn, 50% Ni, 0% Cu), wherein Mn=50% is exclusive.

A reason why Mn is employed as one of the essential elements of the brazing alloy of the present invention will be given below. Exemplary elements which possibly reduce the melting point of a Cu—Ni alloy include Ag, Sn, Zn, Cd, P, Si and Mn. However, Ag reduces the wettability of the Cu—Ni alloy on the stainless steel, and Sn, Zn and P significantly deteriorate the workability of the Cu—Ni alloy. Further, Zn and Cd have high vapor pressures, so that these metals are not suitable for brazing in vacuum and vapor of these metals promotes the oxidation of the surface of the stainless steel. Addition of greater than 2.0% of Si drastically deteriorates the workability of the alloy, and satisfactory reduction of the melting point of the alloy cannot be expected. On the contrary, Mn has none of the aforesaid drawbacks and, hence, Mn is employed as a third element in addition to Cu and Ni for reduction of the melting point of the alloy.

Various studies have been made on the composition of an alloy comprising Cu, Ni and Mn to impart the alloy with excellent corrosion- and oxidation-resistance and a melting point equivalent to that of a copper brazing filler and, as a result, it has been found that the alloy having the composition which falls within the hatched range defined by the points A, B, C, D and E in FIG. 1 (wherein Mn=50% is exclusive) has the aforesaid properties. More specifically, the Cu and Ni contents should be Cu≦55% (preferably, Cu<50%) and Ni≧3.0%, respectively, for excellent corrosion-resistance. If the Mn content is too high, the oxidation-resistance is deteriorated. Therefore, the Mn content should be Mn<50% for excellent oxidation resistance. In order to impart the brazing alloy with a melting point of 1100 to 900° C. so that diffusion of Fe from the stainless steel into the brazing alloy can be suppressed at brazing and so that a structure having a stainless steel component and an iron or a steel component can be braze-assembled simultaneously with annealing of these components, the Ni content should be lower than a line A–B in FIG. 1, because an alloy having a Ni content higher than the line A–B has a melting point higher than 1100° C. A line A–E in FIG. 1 represents a composition range where the Cu content is Cu=0%. The inventors have found that this range is inclusive in the composition range of the brazing alloy for stainless steel.

The composition of the brazing alloy of the invention defined as the contents of the three essential elements Mn, Ni and Cu falls within the hatched range (wherein Mn=50% is exclusive). The term essential elements herein used intends to prohibit neither inclusion of inevitable impurities nor addition of an element that does not deteriorate the corrosion- and oxidation-resistance and the low melting point property of the brazing alloy consisting of the aforesaid three elements, and/or an element that improves these properties. More specifically, where the elements that improve and/or do not deteriorate the properties of the brazing alloy are present in the brazing alloy in a small proportion on the order of less than 10%, nominal contents of the three essential elements Mn, Ni and Cu in the brazing alloy are represented by the products of actual contents of the elements and 100/(100-A) wherein A is the total content (%) of the elements other than the three essential elements and, if the nominal contents fall within the hatched range (wherein Mn<50%) in FIG. 1, the properties of the brazing alloy of the invention are not deteriorated.

The brazing alloy may contain as the properties improving element, for example, one or more of Cr, Co, Mo, Al and Ti and optionally Si, thus having the following composition (1) or (2).

(1) A composition such that one or more elements selected from not greater than 5.0% of Cr, not greater than 5.0% of Co, not greater than 5.0% of Mo, not greater than 5.0% of Al and not greater than 3.0% of Ti are present in the alloy in a total amount of not greater than 5.0% in addition to the essential elements.

(2) A composition such that not greater than 2.0% of Si is present in the alloy in addition to the essential elements or the composition (1).

The following is reasons why the types and contents of the property improving elements are limited as described above.

Not Greater than 5.0% of Cr

Cr improves the corrosion resistance of the alloy. Since addition of a very small amount of Cr brings about a marginal effect, not smaller than 0.1% of Cr is preferably added. On the other hand, if an excessively great amount of Cr is added, the workability of the alloy is deteriorated, so that the upper limit is 5.0%. The Cr content is more preferably 0.3 to 2.0%.

Not Greater than 5.0% of Co

Co improves the corrosion resistance of the alloy as well as the cold/hot plastic workability. Since addition of a very small amount of Co brings about a marginal effect, not smaller than 1.0% of Co is preferably added. On the other hand, even if an excessively great amount of Co is added, the effect levels off, resulting in cost increase. Therefore, the upper limit is 5.0%. The Co content is more preferably 1.0 to 3.0%.

Not Greater than 5.0% of Mo

Mo improves the corrosion resistance of the alloy. Since addition of a very small amount of Mo brings about a marginal effect, not smaller than 0.5% of Mo is preferably added. On the other hand, even if an excessively great amount of Mo is added, the effect levels off, resulting in cost increase. Therefore, the upper limit is 5.0%. The Mo content is more preferably 1.0 to 3.0%.

Not Greater than 5.0% of Al

Al improves the corrosion resistance of the alloy. Since addition of a very small amount of Al brings about a marginal effect, not smaller than 0.1% of Al is preferably added. On the other hand, if an excessively great amount of Al is added, the workability of the alloy is deteriorated, so that the upper limit is 5.0%. The Al content is more preferably 0.3 to 2.0%.

Not greater than 3.0% of Ti

Ti improves the corrosion resistance of the alloy. Since addition of a very small amount of Ti brings about a marginal effect, not smaller than 0.1% of Ti is preferably added. On the other hand, even if an excessively great amount of Ti is added, the effect levels off, resulting in cost increase. Therefore, the upper limit is 3.0%. The Ti content is more preferably 0.3 to 2.0%.

Total Amount of not Greater than 5.0% of One or More Elements Selected from Cr, Co, Mo, Al and Ti If the total amount of these elements exceeds 5.0%, the workability is further deteriorated. Therefore, the total amount is not greater than 5.0%, preferably not greater than 3.0%.

Not Greater than 2.0% of Si

Si reduces the melting point of the alloy. Since addition of a very small amount of Si brings about a marginal effect, not smaller than 0.1% of Si is preferably added. On the other hand, if an excessively great amount of Si is added, the workability is deteriorated, so that the upper limit is 2.0%. The Si content is more preferably 0.3 to 1.0%. Where one or more elements selected from Cr, Co, Mo, Al and Ti are added along with Si, the total amount of these elements is preferably not greater than 5.0%, more preferably not greater than 3.0%.

The brazing alloy of the present invention has the composition described above. The brazing alloy, if having a composition which falls within a range defined by the point A, the point F (23% Mn, 37% Ni, 40% Cu), the point G (35% Mn, 25% Ni, 40% Cu), the point H (50% Mn, 45% Ni, 5% Cu) and the point E within the aforesaid composition range in FIG. 1, is particularly difficult to work. The alloy having a composition which falls within the difficult-to-work range may be shaped into a linear form by sintering the powder of the alloy and optionally further subjecting the sintered alloy to an extruding process at a high temperature and a high pressure.

On the other hand, the alloy, if having a composition which falls within the range defined by the points A, B, C, D, E, A but out of the difficult-to-work range defined by the points A, F, G, H, E, A, is less difficult to work than the alloy having the composition which falls within the difficult-to-work range, but does not have a good workability with a low ductility and a low heat conductivity. Therefore, the alloy of a lower workability needs to be cast into an ingot, which is in turn subjected to a soaking process for a sufficient period, and then to a size reducing process by repeating forging at a relatively low reduction of not greater than 10% and heating. A piece of the forged alloy having a properly reduced size is shaped into a linear form such as a strip, a rod or a wire, for example, by rolling, extrusion or drawing.

Figure 2:
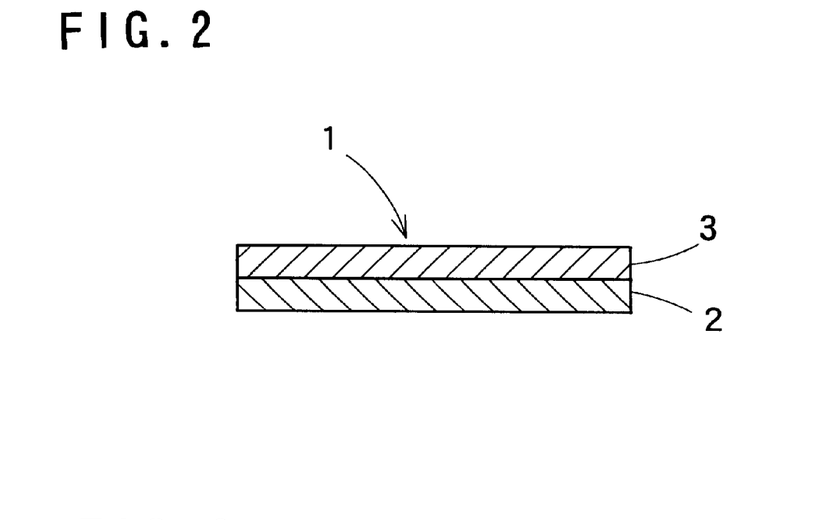
FIG. 2 is a cross-sectional view illustrating the construction of a first embodiment of a brazing material according to the invention.

A brazing material according to the present invention clears up the difficulty in working the brazing alloy. A first embodiment of the brazing material of the invention is shown in FIG. 2. The brazing material 1 is a strip-form composite material having a Mn-based metal layer 2 and a Ni-based metal layer 3 bonded to each other.

The Mn-based metal layer 2 is composed of a Mn—Ni alloy consisting essentially of Mn and Ni or a Mn—Ni—Cu alloy consisting essentially of Mn, Ni and Cu, which has a good workability. Usable as the Mn—Ni—Cu alloy is a general purpose alloy of a high Mn content, such as a high thermal expansion alloy for bimetal, which comprises, for example, 70 to 73% of Mn, 8 to 10% of Ni and the balance of Cu. The Mn—Ni alloy and the Mn—Ni—Cu alloy may include alloys which contain the essential elements and inevitable impurities as well as alloys which contain the essential elements and, as required, one or more elements selected from Cr, Co, Mo, Al, Ti and Si which are property improving elements to be contained in the brazing alloy of the present invention.

On the other hand, the Ni-based metal layer 3 is composed of pure Ni, a Ni alloy consisting essentially of Ni, or a Ni—Cu alloy consisting essentially of Ni and Cu, which has a good workability. Usable as the Ni—Cu alloy are general purpose alloys such as cupro nickel which comprises 2.5 to 30% of Ni and the balance of Cu and Monel metal which comprises 60 to 70% of Ni and the balance of Cu. The Ni alloy and the Ni—Cu alloy may include alloys which contain the essential elements and inevitable impurities as well as alloys which contain the essential elements and, as required, one or more elements selected from Cr, Co, Mo, Al, Ti and Si which are property improving elements to be contained in the brazing alloy of the present invention.

The compositions and thicknesses of the Mn-based metal layer 2 and the Ni-based metal layer 3 are determined such that an average content of each of the elements in any cross section perpendicular to the length of the brazing material 1 falls within the composition range of the brazing alloy of the present invention.

The Mn-based metal layer 2 and the Ni-based metal layer 3, which have a-good workability, can easily be bonded to each other by press at a room temperature (cold press). The press-bonding can easily be achieved by stacking a Mn-based metal film as a material for the Mn-based metal layer 2 and a Ni-based metal film as a material for the Ni-based metal layer 3, and passing the resulting stack between a pair of press rolls to press it at a rolling reduction of about 55 to 70%. The composite material having the Mn-based metal layer and the Ni-based metal layer press-bonded to each other is thereafter rolled once or a plurality of times at a proper rolling reduction as required, whereby a brazing material having a predetermined thickness is provided.

The brazing material 1 typically has an overall thickness of about 0.02 to 2 mm. It is technically difficult to press the composite material down to a thickness of smaller than 0.02 mm and, even if possible, such a thin brazing material is difficult to handle. On the other hand, if the thickness exceeds 2 mm, it is difficult to melt together the respective layers quickly at the brazing and to provide a homogenous alloy. The brazing material may have a proper width depending on the intended application thereof, but typically has a width of about 10 to 40 mm. A smaller-width brazing material can be obtained by slitting a brazing material of a strip form along the length thereof to a proper width.

Figure 3:
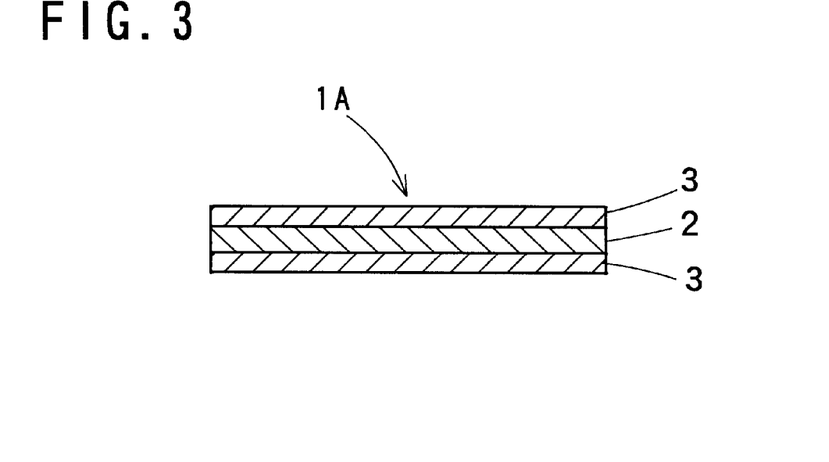
FIG. 3 is a cross-sectional view illustrating the construction of a second embodiment of the brazing material according to the invention.

FIG. 3 illustrates a second embodiment of the brazing material of the present invention. The brazing material 1A is a composite material of a strip form which comprises one Mn-based metal layer 2 and two Ni-based metal layers 3, 3 press-bonded onto opposite surfaces of the Mn-based metal layer. The compositions and thicknesses of the Mn-based metal layer 2 and the Ni-based metal layers 3, 3 are determined such that an average content of each of the elements in any cross section perpendicular to the length of the brazing material 1A falls within the composition range of the brazing alloy of the present invention. In FIG. 3, the Mn-based metal layer 2 and the Ni-based metal layers 3, 3 are denoted by the same reference numerals as those of the brazing material 1 of the first embodiment and no explanation will be given thereto, because they have the same compositions as in the first embodiment.

In the brazing material 1A, the opposite surfaces of the Mn-based metal layer 2 are covered with the Ni-based metal layers 3, 3 which are more corrosion-resistant than the Mn-based metal layer 2, so that the outer surfaces of the brazing material 1A are less susceptible to corrosion. This prevents deterioration in the quality of the brazing material, and ensures easy handling.

The brazing material 1A is also produced by press-bonding the Ni-based metal layers 3, 3 onto the Mn-based metal layer 2 by means of press rolls. The press-bonding may be achieved by stacking Ni-based metal films as materials for the Ni-based metal layers 3, 3 on opposite surfaces of a Mn-based metal film as a material for the Mn-based metal layer 2 and then pressing the resulting stack at a time. Alternatively, the press-bonding may be achieved by staking a Ni-based metal film on one surface of a Mn-based metal film and passing the resulting stack between press rolls to form a double-layer composite material having one of the Ni-based metal layers press-bonded onto the one surface of the Mn-based metal layer, and then stacking another Ni-based metal film on the other surface of the Mn-based metal layer and passing the resulting stack between the press rolls. The brazing material 1A has an overall thickness of about 0.02 to 2 mm as in the first embodiment.

In this embodiment, the two Ni-based metal layers 3, 3 have the same composition and thickness to get excellent dimensional stability along the length of the brazing material 1A against a change in temperature. This ensures better quality and easier handling of the brazing material.

Figure 4:
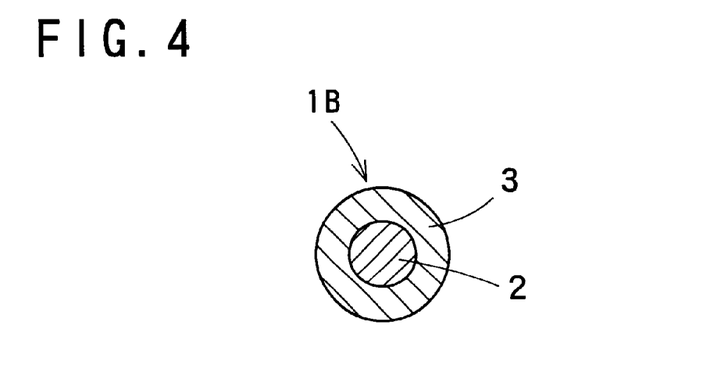
FIG. 4 is a cross-sectional view illustrating the construction of a third embodiment of the brazing material according to the invention.

Although the brazing material 1 of the first embodiment is a strip-shaped brazing material comprising the planar Mn-based metal layer 2 and the planar Ni-based metal layer 3 which are press-bonded to each other in a stacked relation, the brazing material of the invention may be a linear brazing material 1B which comprises a Mn-based metal core layer 2 and a Ni-based metal sheath layer 3 bonded to the circumference of the Mn-based metal core layer as shown in FIG. 4. In FIG. 4, the Mn-based metal layer 2 and the Ni-based metal layer 3 are denoted by the same reference numerals as those of the brazing material 1 of the first embodiment and no explanation will be given thereto, because they have the same compositions as in the first embodiment.

The brazing material 1B is produced by fitting a core material for the Mn-based metal core layer 2 in a sleeve as a material for the Ni-based metal sheath layer 3 and drawing the resulting composite material. During the drawing, the Mn-based metal core layer 2 and the Ni-based metal sheath layer 3 are bonded to each other. The brazing material 1B typically has an outer diameter of about 1 to 3 mm.

Although the brazing material 1A according to the second embodiment comprises one Mn-based metal layer 2 and two Ni-based metal layers 3, 3, any numbers of Mn-based metal layers and Ni-based metal layers may be employed. For example, two Mn-based metal layers and three Ni-based metal layers may be bonded in an alternately stacked relation with the outermost layers being constituted by Ni-based metal layers.

Stainless steel components of a heat exchanger or a chemical apparatus are braze-joined to each other with the use of a brazing material of a strip form or a linear form produced from a cast piece of the brazing alloy of the present invention or with the use of the brazing material 1, 1A or 1B of any of the aforesaid embodiments, whereby a highly corrosion- and oxidation-resistant braze-joint is formed which has the same composition as the aforesaid brazing alloy. For the brazing, the brazing material is placed between the components, and then mating surfaces of the components are brought into intimate contact with the brazing material by pressing. In turn, the brazing material is heated to be melted, and then cooled to be solidified. Alternatively, the components are assembled with the brazing material being interposed therebetween, and then the resulting assembly is heated in an annealing oven with the brazing material being kept in intimate contact with mating surfaces of the components by gravity or by a weight, and cooled. In the latter method, the annealing and brazing of the components can simultaneously be achieved.

Figure 5:
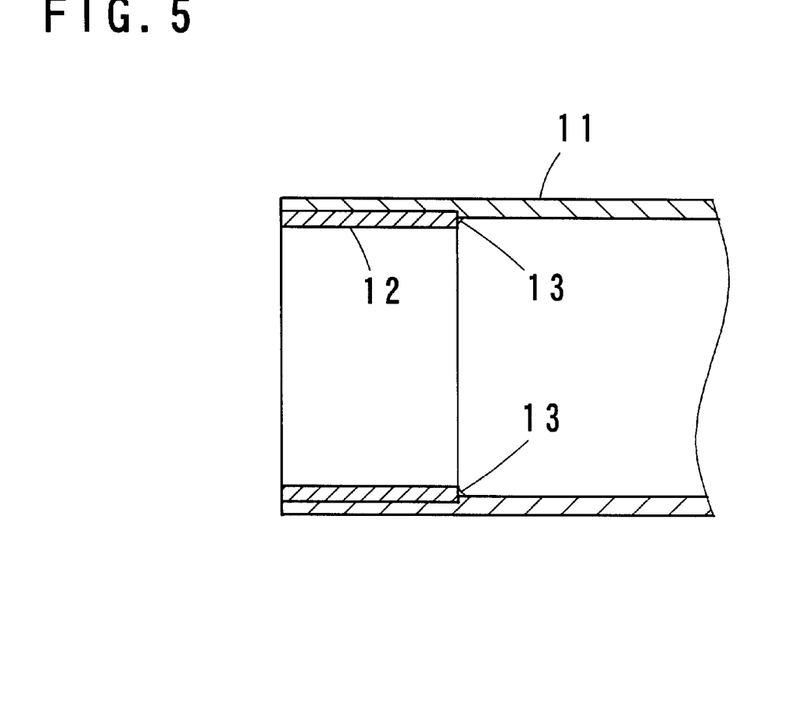
FIG. 5 is a vertical-sectional view illustrating an end portion of a composite pipe with a stainless steel sleeve braze-joined to a steel pipe.

The brazing material associated with the brazing alloy of the present invention can advantageously be used for braze-joining stainless steel components to each other as well as for braze-joining a stainless steel component to an iron or a steel component. FIG. 5 illustrates a composite pipe which comprises a steel pipe 11 and a stainless steel sleeve 12 braze-joined to an internal surface of one end portion of the steel pipe 11. The steel pipe 11 is composed of a difficult-to-weld iron material such as ductile cast iron or austenitic cast iron to which Ni and Cu are added for improved corrosion- and oxidation-resistance. The sleeve 12, which is to be connected to a pump of stainless steel, is fitted in the end portion of the steel pipe 11 with an inner end portion 13 thereof braze-joined to the internal surface of the steel pipe 11. The brazing is achieved by TIG wire welding with the use of the linear brazing material as a filler wire.

EXAMPLES

Brazing materials for stainless steel were prepared, which have compositions as shown in Table 1. Since the compositions of the brazing material samples No. 1 to No. 10 shown in Table 1 would each exhibit a bad workability, these samples were provided as composite brazing materials. More specifically, a Mn-based metal film B and Ni-based metal films A, C of the same width having compositions and thickness ratios (corresponding to cross section area ratios) shown in Table 2 were prepared for each of the samples No. 1 to No. 10, and the Ni-based metal films A, C were stacked on opposite surfaces of the Mn-based metal film B. Then, the resulting stack was passed between a pair of press rolls at a room temperature thereby to be pressed at a rolling reduction of 60%. Thus, a composite material of triple-layer structure having the Ni-based metal layers press-bonded onto the opposite surfaces of the Mn-based metal layer was provided, which was in turn rolled into a strip form having a thickness of 0.05 mm. The compositions of the samples No. 1 to No. 10 in Table 1 were each represented by average contents of the respective elements in any cross section perpendicular to the length of the brazing material.

The other samples were each produced by casting a brazing alloy, sufficiently subjecting a piece of the cast alloy to a soaking process at 800° C. for 6 hours, subjecting the resulting alloy piece to a hot forging process at a reduction area of 10% about six times, and rolling the forged alloy piece into a strip form having a thickness of 0.05 mm.

A corrosion test and an oxidation test were performed on these samples. The corrosion test was performed in the following manner. A SUS304 stainless steel plate (thickness: 1 mm, width: 10 mm, length: 30 mm) and a ductile cast iron plate (thickness: 5 mm, width: 10 mm, length: 30 mm), on which pieces of each of the brazing material samples having the same plate size as the plates are placed, were heated up to a temperature of the melting point of the brazing alloy plus 20° C. in an oven, whereby test samples each having the brazing material fusion-bonded onto the plate were prepared. The test samples were immersed in the following test solution for exhaust gas condensate specified by the Component Corrosion Test Work Group of Society of Automotive Engineers of Japan, Inc. and allowed to stand at a constant temperature of 80° C. for 500 hours. Thereafter, the ratio of a corroded surface area to the entire surface area of the brazing material was determined.

Composition of Test Solution for Exhaust Gas Condensate (in the unit of ppm, pH 4.0) $Cl^-$: 100, $NO_3^-$: 20, $SO_3^{2-}$: 600, $SO_4^{2-}$: 600, $CH_3COO^-$: 800

Figure 6:
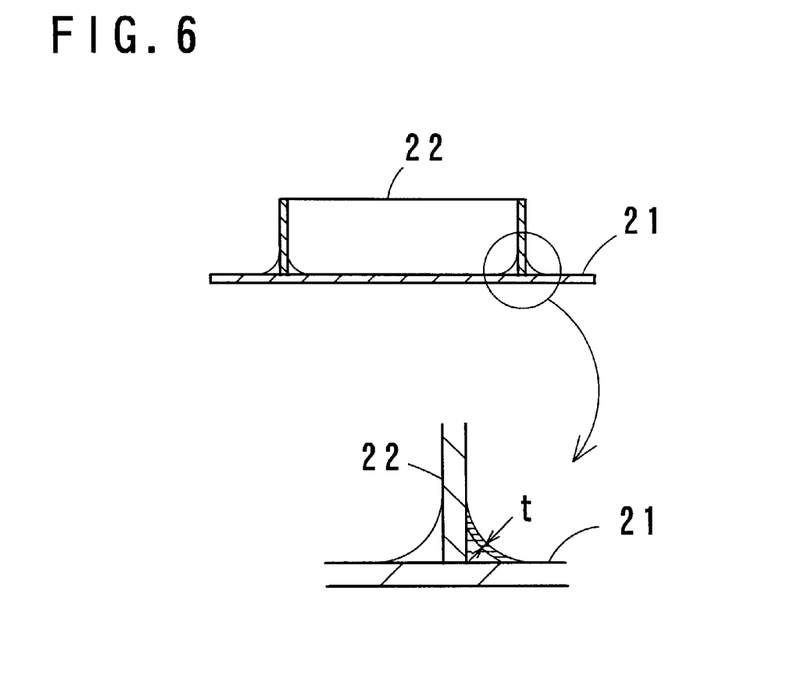
FIG. 6 is a vertical-sectional view illustrating a braze-assembled structure used in an oxidation-resistance test.

The oxidation test was performed in the following manner. Square pieces (thickness: 0.05 mm, 40 mm square) of each of the brazing material samples were respectively placed on a SUS304 stainless steel plate (thickness: 1 mm, 50 mm square) and on a ductile iron plate (thickness: 5 mm, 50 mm square) in a coaxial relation, and then SUS304 pipes (inner diameter: 30 mm, wall thickness: 0.5 mm) were respectively placed on the plates perpendicularly thereto. Thereafter, the resulting assemblies were heated up to a temperature of the melting point of the brazing alloy plus 20° C. in an oven, whereby test structures were each produced with a lower end of the pipe 22 braze-joined to the plate 21 as shown in FIG. 6. These structures were allowed to stand at a constant temperature of 500° C. for 500 hours, and then the thickness t of an oxide film on a fillet of each of the structures was measured. In the test structures braze-assembled with the respective brazing materials, the pipes 22 were firmly bonded to the plates 21.

The test results are also shown in Table 1. It is noted that only data for the test samples and structures employing the stainless plates are shown in Table 1, because substantially the same test results were obtained for the test samples and structures employing the stainless steel plates and those employing the ductile cast iron plates. In Table 1, the samples No. 1 to No. 15 were examples of the present invention, and the samples No. 21 to No. 26 were comparative examples. In FIG. 1, the compositions of the respective brazing alloy samples numbers are plotted on the basis of the Mn and Ni contents of the alloys.

TABLE 1

| Sample No. | 1 | 2 | 3 | 4 | 5 | 6 | 7 | 8 | 9 | 10 | 11 |
|---|---|---|---|---|---|---|---|---|---|---|---|
| Composition of brazing alloy | | | | | | | | | | | |
| Mn | 30 | 35 | 36 | 39 | 36 | 30.6 | 43.2 | 32.5 | 45.7 | 49.7 | 25.2 |
| Ni | 40 | 32 | 37.5 | 56 | 46.3 | 30 | 42 | 47.5 | 48.8 | R | 23 |
| Cu | R | R | R | R | R | R | R | R | R | — | R |
| Cr | — | — | — | — | — | — | — | — | — | — | — |
| Co | — | — | — | — | — | — | — | — | — | — | — |
| Mo | — | — | — | 1.0 | — | — | 4.0 | — | — | — | — |
| Al | — | — | — | 0.8 | 0.75 | — | — | 1.5 | 0.18 | — | 4.3 |
| Ti | — | — | — | 0.2 | 0.25 | — | — | 0.5 | — | — | — |
| Si | — | — | — | — | — | 0.34 | — | — | 0.27 | — | — |
| Melting point (° C.) | 1080 | 1025 | 1030 | 1080 | 1060 | 1030 | 1050 | 1070 | 1050 | 1040 | 1050 |
| Corrosion test result (%) | 0.1 | 0.2 | 0.1 | 0.2 | 0.2 | 0.1 | 0.3 | 0.2 | 0.3 | 0.3 | 0.2 |
| Oxidation test result ($\mu$m) | 50 | 60 | 50 | 40 | 40 | 50 | 60 | 40 | 60 | 50 | 70 |

| Sample No. | 12 | 13 | 14 | 15 | *21 | *22 | *23 | *24 | *25 | *26 |
|---|---|---|---|---|---|---|---|---|---|---|
| Composition of brazing alloy | | | | | | | | | | |
| Mn | 36 | 45 | 48 | 43 | 25 | 22 | 45 | 55 | 55 | 32 |
| Ni | 16 | 8 | 20 | 30 | 50 | 18 | — | 20 | R | R |
| Cu | R | R | R | R | R | R | R | R | — | — |
| Cr | 0.5 | — | 1.2 | 4.8 | — | — | — | — | — | — |
| Co | 3.0 | 1.4 | — | — | — | — | — | — | — | — |
| Mo | — | 0.8 | — | — | — | — | — | — | — | — |
| Al | — | 2.0 | — | — | — | — | — | — | — | — |
| Ti | — | — | 2.6 | — | — | — | — | — | — | — |
| Si | — | — | 1.1 | — | — | — | — | — | — | — |
| Melting point (° C.) | 950 | 940 | 950 | 1000 | 1130 | 1050 | 910 | 970 | 1020 | 1180 |
| Corrosion test result (%) | 0.2 | 0.5 | 0.4 | 0.3 | 1.2 | 0.8 | 0.9 | 0.7 | 0.7 | 1.3 |
| Oxidation test result ($\mu$m) | 60 | 80 | 70 | 50 | 180 | 230 | 250 | 320 | 310 | 170 |

R: Balance
Samples prefixed with * are comparative examples.

TABLE 2

| Sample No. | 1 | 2 | 3 | 4 | 5 | 6 | 7 | 8 | 9 | 10 |
|---|---|---|---|---|---|---|---|---|---|---|
| Thickness ratio | | | | | | | | | | |
| A | 7.6 | 3.1 | 2.2 | 3.3 | 4.4 | 1.0 | 2.9 | 2.4 | 2.0 | 2.0 |
| B | 10 | 5 | 5 | 10 | 10 | 2 | 10 | 5 | 10 | 5 |
| C | 2.7 | 1.5 | 2.2 | 2.9 | 4.7 | 1.0 | 2.9 | 2.4 | 1.9 | 2.0 |
| Ni-based metal film A (wt %) | | | | | | | | | | |
| Ni | 30 | 30 | 65 | R | 100 | 30 | R | 65 | R | 100 |
| Cu | R | R | R | — | — | R | — | R | — | — |
| Others | — | — | — | Al: 4.0, Ti: 1.0 | — | Si: 0.2 | Mo: 10 | Al: 3.0, Ti: 1.0 | Si: 1.8, Mn: 1.6, Al: 1.2 | — |
| Mn-based metal film B (wt %) | | | | | | | | | | |
| Mn | 65 | 72 | 72 | 65 | 72 | 65 | 72 | 65 | 65 | 72 |
| Ni | 30 | 10 | 10 | 30 | 10 | 30 | 10 | 30 | 30 | R |
| Cu | R | R | R | R | R | R | R | R | R | — |
| Si | — | — | — | — | — | 0.5 | — | — | — | — |
| Ni-based metal film C (wt %) | | | | | | | | | | |
| Ni | 100 | 100 | 65 | R | 65 | 30 | R | 65 | R | 100 |
| Cu | — | — | R | — | R | R | — | R | — | — |

TABLE 2-continued

| Sample No. | 1 | 2 | 3 | 4 | 5 | 6 | 7 | 8 | 9 | 10 |
|---|---|---|---|---|---|---|---|---|---|---|
| Others | — | — | — | Mo: 5.0 | Al: 3.0<br>Ti: 1.0 | Si: 0.2 | Mo: 10 | Al: 3.0<br>Ti: 1.0 | Mo: 10 | — |

R: Balance

As can be understood from Table 1, the brazing alloy samples No. 1 to No. 10 of Examples of the present invention each had a melting point of 900 to 1100° C., and gave a corrosion ratio of not greater than 0.5% in the corrosion test and an oxide film thickness of not greater than 80 μm in the oxidation test. On the other hand, the samples No. 21 and No. 26 of Comparative Examples each had a melting point of higher than 1100° C., so that the brazing was carried out at a higher temperature. This resulted in diffusion of Fe from the stainless steel into the braze joint, thereby deteriorating the corrosion-and oxidation-resistance. Although the samples No. 22 to No. 25 of Comparative Examples each had a proper melting point, the compositions of these samples did not fall within the composition range according to the present invention, so that the corrosion- and oxidation-resistance is deteriorated.

INDUSTRIAL APPLICABILITY

The brazing alloy and the brazing material according to the present invention can advantageously be used for braze-joining stainless steel components to each other or stainless steel component to an iron or a steel component in assembling into an exhaust gas heat exchanger or the like which requires corrosion- and oxidation resistance. Further, the structure braze-assembled with the use of the brazing alloy of the present invention has a highly corrosion- and oxidation-resistant braze-joint and, hence, is highly durable.

What is claimed is:

1. A brazing alloy for stainless steel, which is to be used for braze-joining a stainless steel component to a component composed of iron or steel including stainless steel, the brazing alloy comprising a base component consisting essentially of Mn, Ni and Cu, and having a composition in terms of weight percentage which, when plotted on a diagram as shown in FIG. 1, falls within a range defined by:

the point A (37% Mn, 63% Ni, 0% Cu);
   the point B (18% Mn, 27% Ni, 55% Cu);
   the point C (42% Mn, 3% Ni, 55% Cu);
   the point D (50% Mn, 3% Ni, 47% Cu); and
   the point E (50% Mn, 50% Ni, 0% Cu), wherein Mn=50% is exclusive, said brazing alloy further comprising one or more elements selected from the group consisting of 0.1% to 5.0% of Cr, 1.0% to 5.0% of Co, 0.5 to 5.0% of Mo, than 0.1% to 5.0% of Al and 0.1% to 3.0% of Ti which are present in a total amount of not greater than 5.0%.

2. A brazing alloy as set forth in claim 1, further comprising not greater than 2.0% of Si.

3. A braze-assembled structure comprising a stainless steel component and a component composed of iron or steel including stainless steel, wherein the stainless steel component and the component are braze-joined to each other with a brazing alloy as recited in either claims 1 or 2.

4. The brazing alloy of claim 1 comprising 0.1% to 5.0% of Cr.

5. The brazing alloy of claim 1 comprising 1.0% to 5.0% of Co.

6. The brazing alloy of claim 1 comprising 0.5% to 5.0% of Mo.

7. The brazing alloy of claim 1 comprising 0.1% to 5.0% Al.

8. The brazing alloy of claim 1 comprising 0.1% to 3.0% of Ti.

9. A brazing material for stainless steel, which is to be used for braze-joining a stainless steel component to a component composed of iron or steel including stainless steel, the brazing material comprising:

at least one Mn-based metal layer which is composed of a Mn—Ni alloy consisting essentially of Mn and Ni or a Mn—Ni—Cu alloy consisting essentially of Mn, Ni and Cu; and
   at least one Ni-based metal layer which is composed of Ni, a Ni alloy consisting essentially of Ni, or a Ni—Cu alloy consisting essentially of Ni and Cu, wherein the Mn-based metal layer and the Ni-based metal layer are bonded to each other in a stacked relation, and an average content of each of the essential elements in any cross section perpendicular to the length of the brazing material falls within the composition range of a brazing alloy consisting essentially of Mn, Ni and Cu, and having a composition in terms of weight percentage which, when plotted on a diagram as shown in FIG. 1, falls within a range defined by:

the point A (37% Mn, 63% Ni, 0.% Cu);
   the point B (18% Mn, 27% Ni, 55% Cu);
   the point C (42% Mn, 3% Ni, 55% Cu);
   the point D (50% Mn, 3% Ni, 47% Cu); and
   the point E (50% Mn, 50% Ni, 0% Cu), wherein Mn=50% is exclusive.

10. The brazing material of claim 9 wherein said brazing alloy further comprises one or more elements selected from the group consisting of not greater than 5.0% of Cr, not greater than 5.0% of Co, not greater than 5.0% of Mo, not greater than 5.0% of Al and not greater than 3.0% of Ti which are present in a total amount of not greater than 5.0%.

11. The brazing material of claim 9 wherein said brazing alloy further comprises not greater than 2.0% of Si.

12. The brazing material of claim 10 wherein said alloy further comprises not greater than 2.0% of Si.

13. A brazing material for stainless steel, which is to be used for braze-joining a stainless steel component to a component composed of iron or steel including stainless steel, the brazing material comprising:

a Mn-based metal layer which is composed of a Mn—Ni alloy consisting essentially of Mn and Ni or a Mn—Ni—Cu alloy consisting essentially of Mn, Ni and Cu; and
   two Ni-based metal layers which are each composed of Ni, a Ni alloy consisting essentially of Ni, or a Ni—Cu alloy consisting essentially of Ni and Cu, wherein the Ni-based metal layers are stacked on opposite sides of the Mn-based metal layer and press-bonded thereto, and an average content of each of the elements in any cross section perpendicular to the length of the brazing material falls within the composition range of a brazing alloy consisting essentially of Mn, Ni and Cu, and having a composition in terms of weight percentage which, when plotted on a diagram as shown in FIG. 1, falls within a range defined by:

the point A (37% Mn, 63% Ni, 0% Cu);

the point B (18% Mn, 27% Ni, 55% Cu);

the point C (42% Mn, 3% Ni, 55% Cu);

the point D (50% Mn, 3% Ni, 47% Cu); and the point E (50% Mn, 50% Ni, 0% Cu), wherein Mn=50% is exclusives.

14. The brazing material of claim 13, wherein said brazing alloy further comprises one or more elements selected from the group consisting of not greater than 5.0% of Cr, not greater than 5.0% of Co, not greater than 5.0% of Mo, not greater than 5.0% of Al and not greater than 3.0% of Ti which are present in a total amount of not greater than 5.0%.

15. The brazing material of claim 13 wherein said brazing alloy further comprises not greater than 2.0% of Si.

16. The brazing material of claim 14 wherein said brazing alloy further comprises not greater than 2.0% of Si.

* * * * *